US012258532B2

United States Patent
Ogata et al.

(10) Patent No.: US 12,258,532 B2
(45) Date of Patent: *Mar. 25, 2025

(54) REFRIGERATOR OIL, AND WORKING FLUID COMPOSITION FOR REFRIGERATOR

(71) Applicant: ENEOS CORPORATION, Tokyo (JP)

(72) Inventors: Hidetoshi Ogata, Tokyo (JP); Fumiyuki Nara, Tokyo (JP); Yohei Shono, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/920,121

(22) PCT Filed: Apr. 27, 2021

(86) PCT No.: PCT/JP2021/016813
§ 371 (c)(1),
(2) Date: Oct. 20, 2022

(87) PCT Pub. No.: WO2021/221058
PCT Pub. Date: Nov. 4, 2021

(65) Prior Publication Data
US 2023/0167377 A1 Jun. 1, 2023

(30) Foreign Application Priority Data

Apr. 30, 2020 (JP) ................. 2020-080362

(51) Int. Cl.
*C10M 145/14* (2006.01)
*C09K 5/04* (2006.01)
(Continued)

(52) U.S. Cl.
CPC ........... *C10M 145/14* (2013.01); *C09K 5/042* (2013.01); *C10M 101/02* (2013.01);
(Continued)

(58) Field of Classification Search
CPC ........... C10N 2030/06; C10N 2020/02; C10N 2020/101; C10N 2030/02; C10N 2040/30;
(Continued)

(56) References Cited

U.S. PATENT DOCUMENTS 7,914,697 B2   3/2011  Kaneko
2009/0082237 A1  3/2009  Kaneko
(Continued)

FOREIGN PATENT DOCUMENTS

CN   101400769 A   4/2009
CN   102191114 A   9/2011
(Continued)

OTHER PUBLICATIONS

ISR issued in International Patent Application No. PCT/JP2021/016813, Jul. 13, 2021, translation.
(Continued)

*Primary Examiner* — Vishal V Vasisth
(74) *Attorney, Agent, or Firm* — GREENBLUM & BERNSTEIN, P.L.C.

(57) ABSTRACT

An aspect of the present invention provides a refrigerating machine oil containing: a lubricating base oil; and a polymer containing an unsaturated carboxylic acid ester as a monomer unit, wherein the unsaturated carboxylic acid ester contains an ester of an unsaturated carboxylic acid and an alcohol having a hydrocarbon group represented by the following formula (1):

$$-CH_2-C(H) \Big\langle \begin{array}{l} (CH_2)_x-CH_3 \\ (CH_2)_y-CH_3 \end{array} \tag{1}$$

wherein x represents an integer of 5 to 18, and y represents an integer of 3 to 18.

11 Claims, 1 Drawing Sheet

(51) Int. Cl.
  *C10M 101/02*  (2006.01)
  *C10M 169/04*  (2006.01)
  *C10N 20/02*  (2006.01)
  *C10N 30/02*  (2006.01)
  *C10N 40/30*  (2006.01)

(52) U.S. Cl.
  CPC ..... *C10M 169/041* (2013.01); *C09K 2205/12* (2013.01); *C10M 2203/003* (2013.01); *C10M 2209/084* (2013.01); *C10N 2020/02* (2013.01); *C10N 2030/02* (2013.01); *C10N 2040/30* (2013.01)

(58) Field of Classification Search
  CPC .............. C10N 2020/103; C09K 5/042; C09K 2205/12; C10M 101/02; C10M 145/14; C10M 169/041; C10M 171/008; C10M 2203/003; C10M 2203/1006; C10M 2223/047; C10M 2223/043; C10M 2203/1025; C10M 2209/084
  See application file for complete search history.

(56) References Cited

U.S. PATENT DOCUMENTS

| | | | |
|---|---|---|---|
| 2012/0329694 A1* | 12/2012 | Gelder | ................. C10M 119/24 508/468 |
| 2015/0175926 A1 | 6/2015 | Matsui et al. | |
| 2017/0218292 A1 | 8/2017 | Konno | |

FOREIGN PATENT DOCUMENTS

| | | |
|---|---|---|
| CN | 104903431 A | 9/2015 |
| CN | 109072115 A | 12/2018 |
| EP | 0 586 705 A1 | 3/1994 |
| EP | 3 272 842 A1 | 1/2018 |
| EP | 3 546 551 A1 | 10/2019 |
| JP | 2004-315798 A | 11/2004 |
| JP | 2005-281603 A | 10/2005 |
| JP | 2006-274177 A | 10/2006 |
| JP | 2007-204568 A | 8/2007 |
| JP | 2007-262208 A | 10/2007 |
| JP | 2013-129730 A | 7/2013 |
| JP | 2015-013959 A | 1/2015 |
| JP | 2018-016798 A | 2/2018 |
| JP | 2018-028069 A | 2/2018 |
| JP | 2018-083920 A | 8/2018 |
| KR | 10-2008-0103990 | 11/2008 |
| WO | 2007/026646 A1 | 3/2007 |
| WO | 2007/105452 A1 | 9/2007 |
| WO | 2008/093446 A1 | 8/2008 |
| WO | 2015/178233 A1 | 11/2015 |
| WO | 2017/179687 A1 | 10/2017 |
| WO | 2021/100634 A1 | 5/2021 |

OTHER PUBLICATIONS

IPRP issued in International Patent Application No. PCT/JP2021/016813, Nov. 10, 2022.

Search Report issued in EP Patent Application No. 21796311.5, Aug. 28, 2023.

\* cited by examiner

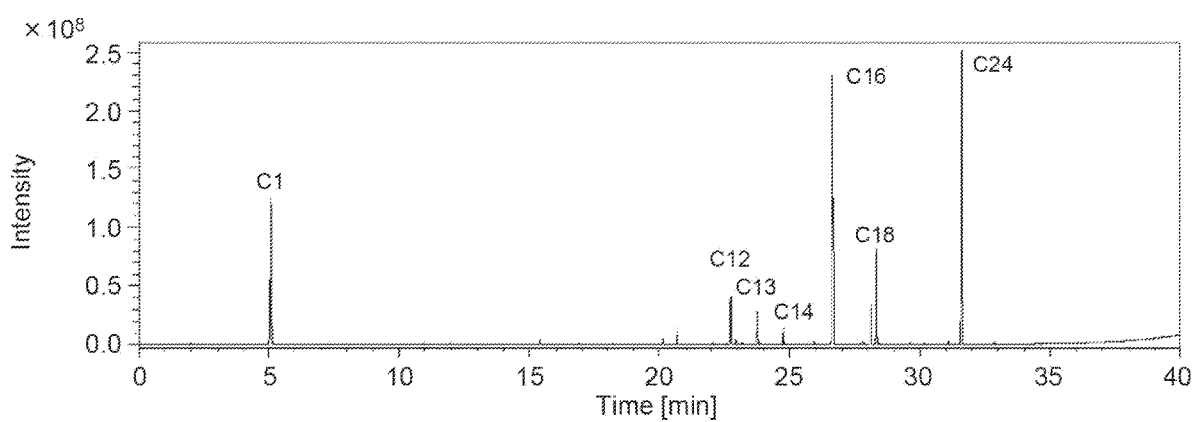
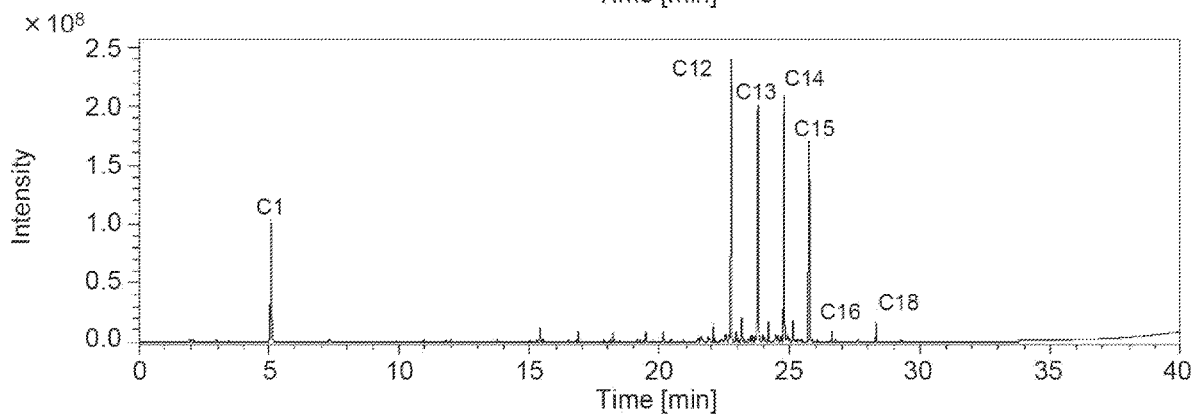

REFRIGERATOR OIL, AND WORKING FLUID COMPOSITION FOR REFRIGERATOR

This application is a 371 of PCT/JP2021/016813, filed Apr. 27, 2021.

TECHNICAL FIELD

The present invention relates to a refrigerating machine oil and a working fluid composition for a refrigerating machine oil.

BACKGROUND ART

A refrigerating machine such as a refrigerator contains a refrigerant circulation system containing a compressor, a condenser, an expansion mechanism (an expansion valve, a capillary), an evaporator, and the like, and heat exchange is performed by circulating a refrigerant in the refrigerant circulation system.

Compressors for refrigerating machines contains rotary compressors, piston-crank compressors, and the like. For example, in a piston-crank type compressor, a rotary motion of a motor is converted into a reciprocating motion by a connecting rod, and a piston coupled to the connecting rod is reciprocated to compress a refrigerant. The refrigerating machine oil is sealed in a compressor together with a refrigerant, and lubricates sliding members such as a connecting rod and a piston. As such a refrigerating machine oil, for example, the following Patent Document 1 discloses a refrigerating machine oil containing a mineral oil having a relatively low viscosity and a specific copolymer.

CITATION LIST

Patent Document

[Patent Document 1] Japanese Unexamined Patent Application Publication No. 2018-83920

SUMMARY OF INVENTION

Technical Problem

When the viscosity of the conventional refrigerating machine oil is lowered, it is effective to some extent for lowering the friction in the fluid lubrication region, but in a low sliding speed region such as an elastic fluid lubrication region, a mixed lubrication region, or a boundary lubrication region, the opportunity of metal-to-metal contact increases, and the friction tends to increase. In addition, for example, the above-described conventional refrigerating machine oil is expected to be effective to some extent in reducing friction in a boundary lubrication region having a high friction coefficient, but is not necessarily sufficient in improving efficiency of a compressor. In particular, in a lubrication region (an elastic fluid lubrication region or a mixed lubrication region) having a relatively high sliding speed in which the friction coefficient rapidly starts to increase as the sliding speed decreases, which is focused on by the present inventors, the effect of reducing friction cannot be sufficiently obtained, and there is still room for improvement in this respect.

The present invention has been made in view of the above-described circumstances, and an object thereof is to provide a refrigerating machine oil having excellent low friction characteristics even in a lubrication region where a sliding speed is relatively high as described above.

Solution to Problem

An aspect of the present invention provides a refrigerating machine oil containing: a lubricating base oil; and a polymer containing an unsaturated carboxylic acid ester as a monomer unit, wherein the unsaturated carboxylic acid ester contains an ester of an unsaturated carboxylic acid and an alcohol having a hydrocarbon group represented by the following formula (1):

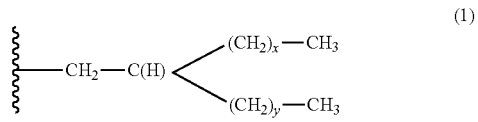

wherein x represents an integer of 5 to 18, and y represents an integer of 3 to 18.

The unsaturated carboxylic acid ester may further contains an ester of an unsaturated carboxylic acid and an alcohol having an alkyl group other than the hydrocarbon group represented by the formula (1).

The lubricating base oil may contain a first hydrocarbon base oil having a kinematic viscosity at 40° C. of less than 6 mm²/s. In this case, the lubricating base oil may be a mixed base oil of the first hydrocarbon base oil and a second hydrocarbon base oil having a kinematic viscosity at 40° C. of 6 mm²/s or more, and a (A)/(B) ratio may be more than 1 and 1.5 or less, wherein a(A) is a kinematic viscosity at 40° C. of the mixed base oil and (B) is the kinematic viscosity at 40° C. of the first hydrocarbon base oil.

A content of the polymer may be 5% by mass or less based on a total amount of the refrigerating machine oil.

The refrigerating machine oil may have a kinematic viscosity at 40° C. of 6 mm²/s or less.

The refrigerating machine oil may be used together with a hydrocarbon refrigerant.

Another aspect of the present invention provides a working fluid composition for a refrigerating machine oil containing the refrigerating machine oil and a refrigerant. The refrigerant may contain a hydrocarbon refrigerant.

Advantageous Effects of Invention

According to the present invention, it is possible to provide a refrigerating machine oil having excellent low friction characteristics even in a lubrication region in which a sliding speed is relatively high.

BRIEF DESCRIPTION OF DRAWINGS

FIG. 1 is a figure showing total ion chromatograms of copolymer 1 (upper part) and copolymer 2 (lower part) in Examples.

DESCRIPTION OF EMBODIMENTS

Hereinafter, embodiments of the present invention will be described in detail.

The refrigerating machine oil according to the present embodiment contains a lubricating base oil and a polymer containing an unsaturated carboxylic acid ester as monomer units.

The lubricating base oil may be any of a mineral oil, a synthetic oil, or a mixture of both. However, from the viewpoint of achieving more excellent frictional properties, it is preferable that the lubricating base oil contains a mineral oil. When the lubricating base oil contains a mineral oil, the lubricating base oil may consist of only the mineral oil (that is, the content of the mineral oil is 100% by mass based on the total amount of the lubricating base oil), and may further contain a base oil component other than the mineral oil. When a base oil component other than the mineral oil is further contained, the content of the mineral oil may be 50% by mass or more, 70% by mass or more, or 90% by mass or more, based on the total amount of the lubricating base oil.

Examples of the mineral oil include mineral oils such as paraffinic mineral oils and naphthenic mineral oils, which are obtained by subjecting a lubricating oil fraction obtained by atmospheric distillation and vacuum distillation of crude oil to refining treatment such as solvent deasphalting, solvent extraction, hydrocracking, solvent dewaxing, catalytic dewaxing, hydrorefining, sulfuric acid washing, and clay treatment alone or in an appropriate combination of two or more thereof. The paraffinic mineral oils are particularly preferably used. These mineral oils may be used alone or in combination of two or more thereof at any ratio.

The ratio of % $C_P$ to % $C_N$ (% $C_P$/% $C_N$) of the mineral oil may be, for example, 0.2 or more, preferably 0.5 or more, more preferably 1 or more, and even more preferably 1.1 or more.

The ratio of % $C_P$ to % $C_N$ (% $C_P$/% $C_N$) of the paraffinic mineral oil may be preferably more than 1, more preferably 1.1 or more, and even more preferably 1.5 or more. When the % $C_P$/% $C_N$ of the paraffinic mineral oil is more than 1, the flash point (COC) is improved (for example, 100° C. or more, preferably 120° C. or more), and a refrigerating machine oil having more excellent friction characteristics can be obtained. In the present specification, % $C_P$ and % $C_N$ mean values measured by a method (n-d-M ring analysis) according to ASTM D3238-95 (2010). The flash point (COC) means a flash point according to the Cleveland open method measured in accordance with JIS K2265-4 (2007).

Examples of the synthetic oil include synthetic hydrocarbon oils and oxygen-containing oils. Examples of the synthetic hydrocarbon oil include alkylbenzenes, alkylnaphthalenes, poly α-olefins (PAO), polybutenes, and ethylene-α-olefin copolymers.

Examples of the oxygen-containing oil include esters, ethers, carbonates, ketones, silicones, and polysiloxanes. The term "ester" used herein does not include the above-mentioned copolymer. Examples of the ester include a monoester, a polyol ester, an aromatic ester, a dibasic acid ester, a complex ester, a carbonate ester and a mixture thereof. Among these, it is preferable to use a monoester of a monohydric aliphatic alcohol and a monocarboxylic fatty acid, and it is desirable to use a mixture of the monoester and a polyol ester of a di- to hexa-hydric alcohol and a monocarboxylic fatty acid as necessary.

Examples of the monohydric aliphatic alcohol constituting such an ester include monohydric aliphatic alcohols having 1 to 20 carbon atoms, preferably 4 to 18 carbon atoms, and more preferably 4 to 12 carbon atoms. Examples of the monocarboxylic fatty acid constituting such an ester include monocarboxylic fatty acids having 1 to 20 carbon atoms, preferably 4 to 18 carbon atoms, and more preferably 4 to 12 carbon atoms. Preferred examples of the di- to hexa-hydric alcohol constituting such an ester include neopentyl glycol, trimethylolpropane, pentaerythritol, and dipentaerythritol. Examples of the ether include polyvinyl ether, polyalkylene glycol, polyphenyl ether, perfluoroether, and mixtures thereof.

The lubricating base oil may contain a hydrocarbon base oil. As the hydrocarbon base oil, for example, a mineral hydrocarbon oil, a synthetic hydrocarbon oil, or a mixture thereof can be used.

The mineral oil-based hydrocarbon oil may be a paraffinic mineral oil, a naphthenic mineral oil or the like obtained by refining a lubricating oil fraction obtained by atmospheric distillation or vacuum distillation of a paraffinic or naphthenic crude oil by a method such as solvent deasphalting, solvent refining, hydrorefining, hydrocracking, solvent dewaxing, hydrodewaxing, clay treatment, or sulfuric acid washing. These purification methods may be used alone or in combination of two or more thereof. Examples of the synthetic hydrocarbon oil include alkylbenzenes, alkylnaphthalenes, poly α-olefins (PAO), polybutenes, and ethylene-α-olefin copolymers.

When the lubricating base oil contains a hydrocarbon base oil, it preferably contains a hydrocarbon base oil having a kinematic viscosity at 40° C. of less than 6 mm$^2$/s (hereinafter also referred to as "first hydrocarbon base oil"). When the lubricating base oil contains the first hydrocarbon base oil, the friction coefficient can be more effectively reduced.

From this viewpoint, the kinematic viscosity at 40° C. of the first hydrocarbon base oil is more preferably 5 mm$^2$/s or less, and even more preferably 4 mm$^2$/s or less. The lower limit of the kinematic viscosity at 40° C. of the first hydrocarbon base oil is not particularly limited, and is, for example, more than 0 mm$^2$/s, preferably 0.5 mm$^2$/s or more, more preferably 1 mm$^2$/s or more, and even more preferably 1.5 mm$^2$/s or more. The kinematic viscosity in the present specification means kinematic viscosity measured in accordance with JIS K2283:2000.

When the lubricating base oil contains the first hydrocarbon base oil, it is preferable that the lubricating base oil further contains a hydrocarbon base oil having a kinematic viscosity at 40° C. of 6 mm$^2$/s or more (hereinafter, also referred to as "second hydrocarbon base oil") in addition to the first hydrocarbon base oil. That is, the lubricating base oil may be a mixed base oil of a first hydrocarbon base oil and a second hydrocarbon base oil. When the lubricating base oil contains the second hydrocarbon base oil in addition to the first hydrocarbon base oil, the friction coefficient can be more effectively reduced.

From such a viewpoint, the kinematic viscosity at 40° C. of the second hydrocarbon base oil is more preferably 8 mm$^2$/s or more, even more preferably 10 mm$^2$/s or more, particularly preferably 50 mm$^2$/s or more, and extremely preferably 90 mm$^2$/s or more. The upper limit of the kinematic viscosity at 40° C. of the second hydrocarbon base oil is not particularly limited, and is, for example, 1000 mm$^2$/s or less, or preferably 500 mm$^2$/s or less.

In the case where the lubricating base oil is a mixed base oil of the first hydrocarbon base oil and the second hydrocarbon base oil, a (A)/(B) ratio is preferably 1.5 or less wherein the kinematic viscosity of the mixed base oil at 40° C. is (A) and the kinematic viscosity of the first hydrocarbon base oil at 40° C. is (B). When the (A)/(B) ratio is 1.5 or less, the friction coefficient can be more effectively reduced. From such a viewpoint, the (A)/(B) ratio is more preferably 1.4 or less, and still more preferably 1.3 or less. The lower limit of (A)/(B) ratio is not particularly limited, but is usually more than 1, and may be, for example, 1.1 or more. When a plurality of base oil components corresponding to the first hydrocarbon base oil or the second hydrocarbon base oil are contained, the above (A) means the kinematic viscosity of the mixed base oil containing all the base oil components corresponding to the first hydrocarbon base oil or the second hydrocarbon base oil. In addition, when a plurality of base oil components corresponding to the first hydrocarbon base oil are contained, (B) means the kinematic viscosity of the mixed base oil containing all of the base oil components corresponding to the first hydrocarbon base oil.

The content of the first hydrocarbon base oil may be 50% by mass or more, 60% by mass or more, 70% by mass or more, 80% by mass or more, 90% by mass or more, or 95% by mass or more, based on the total amount of the first hydrocarbon base oil and the second hydrocarbon base oil (that is, the total amount of the mixed base oil; the same applies hereinafter). The upper limit of the content of the first hydrocarbon base oil is not particularly limited, and may be, for example, less than 100% by mass, 99.9% by mass or less, 99.5% by mass or less, or 99% by mass or less, based on the total amount of the first hydrocarbon base oil and the second hydrocarbon base oil.

The content of the first hydrocarbon base oil may be 50% by mass or more, 60% by mass or more, 70% by mass or more, 80% by mass or more, or 85% by mass or more, based on the total amount of the refrigerating machine oil. The upper limit of the content of the first hydrocarbon base oil is not particularly limited, and may be, for example, 98% by mass or less, 95% by mass or less, or 90% by mass or less, based on the total amount of the refrigerating machine oil.

The content of the second hydrocarbon base oil may be 0.1% by mass or more, 0.5% by mass or more, or 1% by mass or more, based on the total amount of the first hydrocarbon base oil and the second hydrocarbon base oil. The upper limit of the content of the second hydrocarbon base oil may be, for example, 50% by mass or less, 40% by mass or less, 30% by mass or less, 20% by mass or less, 10% by mass or less, or 5% by mass or less, based on the total amount of the first hydrocarbon base oil and the second hydrocarbon base oil.

The content of the second hydrocarbon base oil may be 0.1% by mass or more, 0.5% by mass or more, 1% by mass or more, or 3% by mass or more, based on the total amount of the refrigerating machine oil. The upper limit of the content of the second hydrocarbon base oil is not particularly limited, and may be, for example, 50% by mass or less, 40% by mass or less, 30% by mass or less, 20% by mass or less, 10% by mass or less, or 5% by mass or less, based on the total amount of the refrigerating machine oil.

The total content of the first hydrocarbon base oil and the second hydrocarbon base oil may be, for example, 50% by mass or more, 60% by mass or more, 70% by mass or more, 80% by mass or more, 90% by mass or more, or 100% by mass, based on the total amount of the lubricating base oil.

The total content of the first hydrocarbon base oil and the second hydrocarbon base oil may be 50% by mass or more, 60% by mass or more, 70% by mass or more, 80% by mass or more, or 90% by mass or more, based on the total amount of the refrigerating machine oil.

From the viewpoint of more effectively reducing the friction coefficient, the kinematic viscosity at 40° C. of the lubricating base oil is preferably 20 mm²/s or less, more preferably 10 mm²/s or less, even more preferably 6 mm²/s or less, even more preferably 4 mm²/s or less, and particularly preferably 3.5 mm²/s or less. The lower limit of the kinematic viscosity at 40° C. of the lubricating base oil is not particularly limited, and may be, for example, 0.5 mm²/s or more, preferably 1 mm²/s or more, and more preferably 1.5 mm²/s or more.

The kinematic viscosity at 100° C. of the lubricating base oil may be preferably 0.5 mm²/s or more, more preferably 0.8 mm²/s or more, still more preferably 1 mm²/s or more. The kinematic viscosity at 100° C. of the lubricating base oil may be preferably 10 mm²/s or less, more preferably 5 mm²/s or less, still more preferably 3 mm²/s or less, particularly preferably 2 mm²/s or less or 1.5 mm²/s or less.

The content of the lubricating base oil may be 50% by mass or more, 60% by mass or more, 70% by mass or more, 80% by mass or more, or 90% by mass or more, and may be 99.9% by mass or less, 99.5% by mass or less, or 99% by mass or less, based on the total amount of the refrigerating machine oil.

The polymer contained in the refrigerating machine oil according to the present embodiment contains an unsaturated carboxylic acid ester as a monomer unit. The unsaturated carboxylic acid ester contains an ester (Eg) of an unsaturated carboxylic acid (carboxylic acid having a polymerizable unsaturated bond) and an alcohol having a hydrocarbon group (branched alkyl group) represented by the following formula (1):

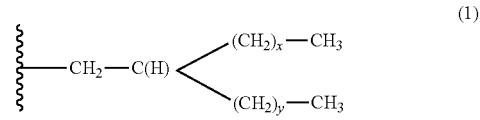

wherein x represents an integer of 5 to 18, and y represents an integer of 3 to 18.

The polymer is not particularly limited as long as it contains the above Eg as a monomer unit, and may further contain an additional monomer. The additional monomer may be an unsaturated carboxylic acid ester other than the above-described Eg, or may be a monomer other than the unsaturated carboxylic acid ester (a monomer copolymerizable with an unsaturated carboxylic acid ester). Examples of the unsaturated carboxylic acid ester other than Eg include an ester (Es) of an unsaturated carboxylic acid and an alcohol having a linear alkyl group and an ester (Eb; Eg is excluded) of an unsaturated carboxylic acid and an alcohol having a branched alkyl group.

The unsaturated carboxylic acid constituting Eg has at least one polymerizable unsaturated bond (polymerizable carbon-carbon double bond) and at least one carboxyl group, and may be, for example, an unsaturated monocarboxylic acid having one polymerizable unsaturated bond and one carboxyl group, or an unsaturated dicarboxylic acid having one polymerizable unsaturated bond and two carboxyl groups. Examples of the unsaturated monocarboxylic acid include acrylic acid, methacrylic acid, and crotonic acid. Examples of the unsaturated dicarboxylic acid include maleic acid, fumaric acid, citraconic acid, mesaconic acid, and itaconic acid. The unsaturated carboxylic acid is preferably acrylic acid or methacrylic acid (hereinafter also collectively referred to as "(meth)acrylic acid") or maleic acid, and more preferably (meth)acrylic acid.

The alcohol constituting Eg is preferably an alcohol represented by the following formula (2):

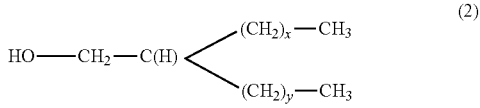

wherein x and y have the same meanings as x and y in the formula (1), respectively.

In the above formula (1) and formula (2), x is an integer of preferably 9 to 17, more preferably 10 to 14. y is an integer of preferably 7 to 15, and more preferably 7 to 12. x-y may be, for example, 2 or more and 15 or less, preferably 10 or less, more preferably 6 or less, and most preferably 2.

Examples of such alcohols include 0-branched alcohols (so-called Guerbet alcohols) synthesized by a Guerbet reaction in which raw material alcohols are dimerized. The Guerbet alcohol may be, for example, a Guerbet alcohol having 12 to 40 carbon atoms, preferably 12 to 36 carbon atoms (specifically, 12, 14, 16, 18, 20, 24, 28, 32, 36 carbon atoms), and more preferably 20 to 36 carbon atoms (20, 24, 28, 32, 36).

Specific examples of such Guerbet alcohols include 2-butyloctanol (x=5, y=3), 2-hexyldecanol (x=7, y=5), 2-octyldodecanol (x=9, y=7), 2-decyltetradecanol (x=11, y=9), 2-dodecylhexadecanol (x=13, y=11), 2-tetradecyloctadecanol (x=15, y=13), and 2-hexadecyleicosanol (x=17, y=15). The method for producing Guerbet alcohols may be a known production method (for example, production methods described in Japanese Unexamined Patent Application Publication No. 2015-13815 and Patent Documents 1 and 2 described in the publication).

Examples of the unsaturated carboxylic acid constituting Es include unsaturated monocarboxylic acids such as (meth)acrylic acid and crotonic acid, and unsaturated dicarboxylic acids such as maleic acid, fumaric acid, citraconic acid, mesaconic acid and itaconic acid. The unsaturated carboxylic acid is preferably (meth)acrylic acid or maleic acid, and more preferably (meth)acrylic acid.

The alcohol constituting Es is an aliphatic alcohol having a linear alkyl group having 1 to 40 carbon atoms, preferably 1 to 30 carbon atoms, and more preferably 1 to 18 carbon atoms. Examples of the linear aliphatic alcohol include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, and octadecanol.

Examples of the unsaturated carboxylic acid constituting Eb include unsaturated monocarboxylic acids such as (meth)acrylic acid and crotonic acid, and unsaturated dicarboxylic acids such as maleic acid, fumaric acid, citraconic acid, mesaconic acid and itaconic acid. The unsaturated carboxylic acid is preferably (meth)acrylic acid or maleic acid, and more preferably (meth)acrylic acid.

The alcohol constituting Eb is an aliphatic alcohol having a branched alkyl group having 3 to 40 carbon atoms, preferably 4 to 30 carbon atoms, and more preferably 6 to 18 carbon atoms (excluding the branched alkyl group represented by the above formula (1)). Examples of the alcohol include 2-propanol, 2-methylpropanol, 2-methylbutanol, 2-methylpentanol, 2-methylhexanol, 2-methylheptanol, 2-ethylhexanol, 2-methyloctanol, and 3,5,5-trimethylhexanol.

The monomer other than the unsaturated carboxylic acid ester (a monomer copolymerizable with the unsaturated carboxylic acid ester) is not particularly limited, and examples thereof include unsaturated carboxylic acids or anhydrides thereof exemplified as the unsaturated carboxylic acid constituting the unsaturated carboxylic acid ester described above, unsaturated hydrocarbon compounds having a polymerizable unsaturated bond, and the like. The unsaturated hydrocarbon may be, for example, an unsaturated hydrocarbon compound having 2 to 20 carbon atoms, and may be preferably an α-olefin having 2 to 20 carbon atoms or styrene. Specific examples of the α-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

The polymer contained in the refrigerating machine oil according to the present embodiment is a (co)polymer containing Eg as a monomer unit. In one embodiment, the polymer is preferably a copolymer containing Eg and Es as monomer units and may further contain the Eb as a monomer unit because basic performances such as a viscosity index improving effect and a pour point lowering effect can be obtained in good balance.

The content of Eg in such a copolymer is preferably 1% by mole or more, more preferably 3% by mole or more, even more preferably 6% by mole or more, and particularly preferably 8% by mole or more, and is preferably 90% by mole or less, more preferably 50% by mole or less, even more preferably 30% by mole or less, and particularly preferably 20% by mole or less or 15% by mole or less, based on the total monomer units constituting the copolymer.

The content of Es in the copolymer is preferably 10% by mole or more, more preferably 50% by mole or more, even more preferably 70% by mole or more, and particularly preferably 80% by mole or more or 85% by mole or more, and is preferably 99% by mole or less, more preferably 97% by mole or less, even more preferably 94% by mole or less, and particularly preferably 92% by mole or less, based on the total monomer units constituting the copolymer.

The proportion of Es (Es-1) in which the linear alkyl group in the alcohol constituting Es is a linear alkyl group having 1 to 4 carbon atoms is preferably 5% by mole or more, more preferably 10% by mole or more, and even more preferably 14% by mole or more, and is preferably 95% by mole or less, more preferably 85% by mole or less, and even more preferably 80% by mole or less, based on the total monomer units constituting the copolymer. Examples of Es-1 include methyl (meth)acrylate, ethyl (meth)acrylate, propyl (meth)acrylate, and butyl (meth)acrylate. Es-1 is preferably methyl (meth)acrylate, particularly preferably methyl methacrylate.

The proportion of Es (Es-2) in which the linear alkyl group in the alcohol constituting Es is a linear alkyl group having 5 to 19 carbon atoms is preferably 5% by mole or more, more preferably 10% by mole or more, and even more preferably 14% by mole or more, and is preferably 95% by mole or less, more preferably 85% by mole or less, and even more preferably 80% by mole or less, based on the total monomer units constituting the copolymer. Es-2 is preferably a linear alkyl (meth)acrylate having 8 to 18 carbon atoms, and specific examples thereof include octyl (meth)acrylate, decyl (meth)acrylate, dodecyl (meth)acrylate, tridecyl (meth)acrylate, tetradecyl (meth)acrylate, pentadecyl (meth)acrylate, hexadecyl (meth)acrylate, and octadecyl (meth)acrylate, with linear alkyl (meth)acrylates having 12 to 18 carbon atoms being more preferred.

The polymer contained in the refrigerating machine oil according to the exemplary embodiment is preferably a copolymer containing Eg, Es-1, and Es-2 as monomer units. In this case, the proportion of Eg with respect to 100% by mole of the total of Eg, Es-1, and Es-2 may be 1% by mole or more, 3% by mole or more, 5% by mole or more, or 8% by mole or more, and may be 90% by mole or less, 50% by mole or less, 30% by mole or less, or 20% by mole or less. The proportion of Es-1 with respect to 100% by mole of the total of Eg, Es-1, and Es-2 may be 10% by mole or more, 30% by mole or more, 40% by mole or more, or 60% by mole or more, and may be 90% by mole or less, 80% by mole or less, or 75% by mole or less. The proportion of Es-2 with respect to 100% by mole of the total of Eg, Es-1, and Es-2 may be 1% by mole or more, 5% by mole or more, 10% by mole or more, or 15% by mole or more, and may be 50% by mole or less, 40% by mole or less, 30% by mole or less, or 25% by mole or less. In addition, the total proportion of Eg, Es-1, and Es-2 may be 80% by mole or more, 85% by mole or more, or 90% by mole or more, based on the total monomer units constituting the copolymer.

The polymer contained in the refrigerating machine oil according to the present embodiment is a (co)polymer containing Eg as a monomer unit, but may further contain, as a monomer unit, an additional monomer other than the unsaturated carboxylic acid ester described above, for example, an α-olefin in one embodiment because basic performances such as a viscosity index improving effect and a pour point lowering effect can be obtained in a balanced manner. In this case, the molar ratio of the sum of Eg, Es and Eb/the additional monomer (α-olefin) is not particularly limited, but may be preferably 1/9 or more, more preferably 3/7 or more, and is preferably 9/1, more preferably 7/3 or less.

The weight average molecular weight (Mw) of the polymer is preferably 400 or more, more preferably 1,000 or more, even more preferably 2000 or more, and particularly preferably 3000 or more, may be 5000 or more, 8000 or more, 10000 or more, 12000 or more, 14000 or more, or 15000 or more, and is preferably 10000000 or less, more preferably 100000 or less, even more preferably 50000 or less, particularly preferably 30000 or less, and may be 25000 or less or 20000 or less.

The number average molecular weight (Mn) of the polymer is preferably 300 or more, more preferably 1000 or more, even more preferably 1500 or more, and particularly preferably 3000 or more, may be 4000 or more, 5000 or more, 6000 or more, 7000 or more, 8000 or more, or 9000 or more, and may be preferably 500000 or less, more preferably 50000 or less, even more preferably 30000 or less, and may be 20000 or less or 15000 or less.

Mw/Mn of the polymer is preferably 1.2 or more, more preferably 1.5 or more, even more preferably 1.7 or more, and particularly preferably 2 or more, and is preferably 5 or less, more preferably 3.5 or less, and even more preferably 3 or less, and may be 2.5 or less or 2 or less.

In the present specification, "weight average molecular weight (Mw)" and "number average molecular weight (Mn)" respectively mean a weight average molecular weight and a number average molecular weight in terms of polystyrene determined by gel permeation chromatography (GPC) (standard substance: polystyrene) using an APC XT column manufactured by Waters Corporation as a column and tetrahydrofuran as a mobile phase.

The polymer according to the present embodiment may be added as a polymer additive in a refrigerating machine oil. The polymer additive may further contain components other than the polymer, such as a diluent oil, in addition to the polymer. When the polymer additive contains other components, the number average molecular weight (Mn) and the weight average molecular weight (Mw) of the polymer are measured after excluding the other components.

The content of the polymer is not particularly limited, but is preferably 0.1% by mass or more, more preferably 0.5% by mass or more, and even more preferably 0.8% by mass or more, from the viewpoint of further improving the friction characteristics of the refrigerating machine oil, and may be preferably 5% by mass or less, more preferably 2% by mass or less, still more preferably less than 2% by mass, particularly preferably 1% by mass or less, and may be less than 1% by mass, from the viewpoint of suppressing the viscosity of the refrigerating machine oil and achieving a lower friction coefficient even in a region where the sliding speed is relatively high, based on the total amount of the refrigerating machine oil The refrigerating machine oil according to the present embodiment may further contain an additional additive in addition to the above-described components. Examples of the additive include an antioxidant, an acid scavenger, an extreme pressure agent, a metal deactivator, an anti-wear agent, a pour point depressant, and a detergent dispersant. The content of these additives may be 10% by mass or less, or 5% by mass or less, based on the total amount of the refrigerating machine oil, unless otherwise specified below.

Examples of the antioxidant include phenol-based antioxidants and amine-based antioxidants. Examples of the phenol-based antioxidant include 2,6-di-tert.-butyl-p-cresol (DBPC), 2,6-di-tert.-butyl-phenol, and 4,4'-methylenebis (2,6-di-tert.-butyl-phenol). Examples of the amine-based antioxidant include phenyl-α-naphthylamines and dialkylated diphenylamines. These antioxidants may be used alone or in combination of two or more thereof. The content of the antioxidant is, for example, 0.01 to 5% by mass, preferably 0.1 to 3% by mass, based on the total amount of the refrigerating machine oil.

Examples of the acid scavenger include an epoxy compound (epoxy-based acid scavenger). Examples of the epoxy compound include glycidyl ether type epoxy compounds, glycidyl ester type epoxy compounds, aryloxirane compounds, alkyloxirane compounds, alicyclic epoxy compounds, epoxidized fatty acid monoesters, and epoxidized vegetable oils. These acid scavengers may be used alone or in combination of two or more thereof. The content of the acid scavenger is, for example, 0.01 to 5% by mass and preferably 0.1 to 3% by mass, based on the total amount of the refrigerating machine oil.

Examples of the extreme pressure agent include phosphorus-based extreme pressure agents. Examples of the phosphorus-based extreme pressure agent include phosphoric acid esters, acidic phosphoric acid esters, amine salts of acidic phosphoric acid esters, chlorinated phosphoric acid esters, phosphorous acid esters, and phosphorothionates. The phosphoric acid ester is preferably triphenyl phosphate (TPP), tricresyl phosphate (TCP), or triphenyl phosphorothionate (TPPT). These extreme pressure agents may be used alone or in combination of two or more. The content of the extreme pressure agent is, for example, 0.01 to 5% by mass and preferably 0.1 to 3% by mass, based on the total amount of the refrigerating machine oil.

The kinematic viscosity at 40° C. of the refrigerating machine oil is preferably 6 mm$^2$/s or less, more preferably 5 mm$^2$/s or less, and still more preferably 4 mm$^2$/s or less. The lower limit of the kinematic viscosity at 40° C. of the refrigerating machine oil is not particularly limited, and may be, for example, 1 mm$^2$/s or more or 2 mm$^2$/s or more.

The kinematic viscosity at 100° C. of the refrigerating machine oil may be preferably 0.5 mm$^2$/s or more, more preferably 0.8 mm$^2$/s or more, and still more preferably 1 mm$^2$/s or more. The kinematic viscosity at 100° C. of the refrigerating machine oil may be preferably 10 mm$^2$/s or less, more preferably 5 mm$^2$/s or less, still more preferably 3 mm$^2$/s or less, and particularly preferably 2 mm$^2$/s or less.

The viscosity index of the refrigerating machine oil may be −50 or more, preferably 0 or more, more preferably 50 or more, and may be 200 or less. The viscosity index in the present specification means a viscosity index measured in accordance with JIS K2283:2000.

The pour point of the refrigerating machine oil may be preferably −10° C. or lower, more preferably −20° C. or lower. The pour point in the present specification mean a pour point measured in accordance with JIS K2269:1987.

The volume resistivity of the refrigerating machine oil may be preferably $1.0 \times 10^9$ Ω·m or more, more preferably $1.0 \times 10^{10}$ Ω·m or more, and still more preferably $1.0 \times 10^{11}$ Ω·m or more. The volume resistivity in the present specification mean a volume resistivity at 25° C. measured in accordance with JIS C2101:1999.

The moisture content of the refrigerating machine oil may be preferably 200 ppm or less, more preferably 100 ppm or less, and still more preferably 50 ppm or less, based on the total amount of the refrigerating machine oil. The moisture content in the present specification means a moisture content measured in accordance with JIS K2275-2 or 3 (Karl Fischer volumetric titration method or coulometric titration method).

The acid value of the refrigerating machine oil may be preferably 1.0 mgKOH/g or less, more preferably 0.1 mgKOH/g or less. The hydroxyl value of the refrigerating machine oil is, for example, 10 mgKOH/g or less, preferably 5 mgKOH/g or less, and more preferably 2 mgKOH/g or less. The acid value in the present specification means an acid value measured in accordance with JIS K2501:2003. The hydroxyl value in the present specification means a hydroxyl value measured in accordance with JIS K0070: 1992.

The ash content of the refrigerating machine oil may be preferably 100 ppm or less, and more preferably 50 ppm or less. The ash content in the present specification means an ash content measured in accordance with JIS K2272:1998.

The refrigerating machine oil according to the present embodiment is usually mixed with a refrigerant present in a state of a working fluid composition for a refrigerating machine oil in a refrigerating machine containing a refrigerant circulation system containing a compressor, a condenser, an expansion mechanism, and an evaporator, and lubricates, for example, a sliding member in the compressor. That is, another embodiment of the present invention is a working fluid composition for a refrigerating machine oil containing the refrigerating machine oil and a refrigerant. The content of the refrigerating machine oil in the working fluid composition for a refrigerating machine oil may be 1 to 500 parts by mass or 2 to 400 parts by mass, with respect to 100 parts by mass of the refrigerant.

Examples of the refrigerant include hydrocarbon refrigerants, saturated hydrofluorocarbon refrigerants, unsaturated hydrofluorocarbon refrigerants, fluorine-containing ether-based refrigerants such as perfluoroethers, bis (trifluoromethyl) sulfide refrigerants, trifluoroiodomethane refrigerants, and natural refrigerants such as ammonia and carbon dioxide. In particular, the refrigerating machine oil according to the present embodiment is preferably used together with a hydrocarbon refrigerant. In other words, the working fluid composition for a refrigerating machine oil preferably contains a refrigerating machine oil and a hydrocarbon refrigerant.

The hydrocarbon refrigerant is preferably a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. Among these, the hydrocarbon refrigerant is preferably a hydrocarbon refrigerant that is gaseous at 25° C. and 1 atm, and more preferably propane, normal butane, isobutane, 2-methylbutane, or a mixture thereof.

The saturated hydrofluorocarbon refrigerant is a saturated hydrofluorocarbon having preferably 1 to 3 carbon atoms, more preferably 1 to 2 carbon atoms. Specific examples of the saturated hydrofluorocarbon refrigerant include difluoromethane (R32), trifluoromethane (R23), pentafluoroethane (R125), 1,1,2,2-tetrafluoro ethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The saturated hydrofluorocarbon refrigerant is appropriately selected from the above depending on the application and the required performance. Examples of the saturated hydrofluorocarbon refrigerant include R32 alone; R23 alone; R134a alone; R125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R125 of 60% by mass/30% by mass/10% by mass; a mixture of R134a/R32/R125 of 40 to 70% by mass/15 to 35% by mass/5 to 40% by mass; and a mixture of R125/R134a/R143a of 35 to 55% by mass/1 to 15% by mass/40 to 60% by mass. More specific examples of the saturated hydrofluorocarbon refrigerant include a mixture of R134a/R32 of 70/30% by mass; a mixture of R32/R125 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407C); a mixture of R32/R125/R134a of 25/15/60% by mass (R407E); and a mixture of R125/R134a/R143a of 44/4/52% by mass (R404A).

The unsaturated hydrofluorocarbon (HFO) refrigerant is preferably an unsaturated hydrofluorocarbon having 2 to 3 carbon atoms, more preferably a fluoropropene, and still more preferably a fluoropropene having 3 to 5 fluorine atoms. The unsaturated hydrofluorocarbon refrigerant is preferably any one or a mixture of two or more of 1,2,3,3,3-pentafluoropropene (HFO-1225ye), 1333-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). The unsaturated hydrofluorocarbon refrigerant is preferably one or two or more selected from HFO-1225ye, HFO-1234ze and HFO-1234yf from the viewpoint of refrigerant physical properties. The unsaturated hydrofluorocarbon refrigerant may be fluoroethylene having 1 to 3 fluorines, and is preferably 1,1,2,3-trifluoroethylene.

EXAMPLES

Hereinafter, the present invention will be described in more detail based on examples, but the present invention is not limited to the following examples.

(Lubricating Base Oil)

Base oils 1 to 3 shown below were prepared and mixed such that the contents of base oil 1, base oil 2, and base oil 3 were 50 parts by mass, 43 parts by mass, and 7 parts by mass, respectively, as shown in Table 1, to obtain mixed base oils.

Base oil 1: mineral oil (kinematic viscosity at 40° C.: 3.4 mm$^2$/s)

Base oil 2: mineral oil (kinematic viscosity at 40° C.: 2.4 mm$^2$/s)

Base oil 3: mineral oil (kinematic viscosity at 40° C.: 100 mm$^2$/s)

The base oil 1 and the base oil 2 correspond to the first hydrocarbon base oil described above, and the base oil 3 corresponds to the second hydrocarbon base oil described above.

The kinematic viscosity at 40° C. of the obtained mixed base oil (A) [mm$^2$/s], the kinematic viscosity at 40° C. of the first hydrocarbon base oil (a mixture of base oil 1/base oil 2=50 parts by mass/43 parts by mass) (B) [mm$^2$/s], and the value of (A)/(B) ratio are shown in Table 1 below.

TABLE 1

|  |  |  | Mixed base oil |
|---|---|---|---|
| First hydrocarbon base oil | Base oil 1 | Parts by | 50 |
|  | Base oil 2 | mass | 43 |
| Second hydrocarbon base oil | Base oil 3 |  | 7 |
| Properties regarding | (A) | mm$^2$/s | 3.35 |
| kinematic viscosity | (B) |  | 2.80 |
|  | (A)/(B) | — | 1.20 |

(Refrigerating Machine Oil)

In Examples and Comparative Examples, refrigerating machine oils having compositions (% by mass based on the total amount of the refrigerating machine oil) shown in Table 2 were prepared by using the lubricating base oil (mixed base oil), and the following copolymer and phosphorus-based extreme pressure agent as additives.

Copolymer 1: a copolymer of a monomer mixture containing methyl methacrylate (C1, 70% by mole), long-chain linear alkyl methacrylate (n-dodecyl methacrylate (C12), n-tridecyl methacrylate (C13), n-tetradecyl methacrylate (C14), n-hexadecyl methacrylate (C16), n-octadecyl methacrylate (C18)) (19% by mole in total) and 2-decyl-tetradecyl methacrylate (C24, 11% by mole) as main components (Mn=10500, Mw=18000, Mw/Mn=1.7)

Note that 2-decyl-tetradecyl methacrylate has a hydrocarbon group in which x=11 and y=9 in the formula (1). Further, the content of the main component was 90% by mole or more based on the total amount of the monomer mixture.

Copolymer 2: a copolymer of a monomer mixture containing, as main components, methyl methacrylate (C1, 49% by mole), long-chain linear alkyl methacrylate (n-dodecyl methacrylate (C12), n-tridecyl methacrylate (C13), n-tetradecyl methacrylate (C14), n-pentadecyl methacrylate (C15), n-hexadecyl methacrylate (C16), n-octadecyl methacrylate (C18)) (43% by mole in total), and branched alkyl methacrylate having branched alkyl groups having less than 20 carbon atoms other than the hydrocarbon group represented by the formula (1) (8% by mole in total) (Mn=9300, Mw=16000, Mw/Mn=1.7)

Note that the content of the main component was 90% by mole or more based on the total amount of the monomer mixture.

The structures of monomers constituting the copolymers 1 and 2 were observed by thermal decomposition GC/MS, IR and $^{13}$C-NMR analyses. In the thermal decomposition GC/MS, a thermal decomposition product (500° C.) of the rubber membrane dialysis residue was analyzed using Agilent 7890B and JMS-T200GC manufactured by JEOL Ltd. (column: ZB-5HT and inertized fused silica, split ratio: 100:1, temperature rise condition: 40° C. to 400° C., 10° C./min) As an example of the analysis results, the total ion chromatogram (ionization method: EI) is shown in FIG. 1. The upper part of FIG. 1 is a total ion chromatogram of the copolymer 1, and the lower part is a total ion chromatogram of the copolymer 2. The symbols C1, C12 and the like in FIG. 1 correspond to the symbols C1, C12 and the like added to the monomers in the explanations of the copolymers 1 and 2 described above (meaning that they are peaks derived from the monomers to which the symbols are added). Linear alkyl methacrylate and 2-decyl-tetradecyl methacrylate were also confirmed by comparison with the above analysis results using (co)polymers of known monomers.

Phosphorus-based extreme pressure agent: A mixture of tricresyl phosphate (TCP) and triphenyl phosphorothionate (TPPT)

(Evaluation of Friction Characteristics)

In order to evaluate the friction characteristics of each of the refrigerating machine oils of Examples and Comparative Examples, the following tests were performed.

Using an MTM (Mini Traction Machine) tester (manufactured by PCS Instruments), the friction coefficient (μ) in each lubrication region was measured under the following conditions. The results are shown in Table 2. The smaller the friction coefficient is, the more excellent the friction characteristics are.

Ball and disc: standard test piece (AISI52100 standard)

Test temperature: 40° C.

Sliding speed: 0.0006 to 0.9 m/s (partially extracted)

Load: 10N

Slip ratio: 30%

The value of $|U_D-U_B|$ [m/s] was used as the sliding speed, wherein $U_D$ is the speed [m/s] of the disk in the sliding part and $U_B$ is the speed [m/s] of the ball in the sliding part.

TABLE 2

|  |  | Example 1 | Example 2 | Comp. Example 1 | Comp. Example 2 | Comp. Example 3 | Comp. Example 4 |
|---|---|---|---|---|---|---|---|
| Composition | Lubricating base oil | Balance | Balance | Balance | Balance | Balance | Balance |
| (% by mass) | Copolymer 1 | 1 | 2 | — | — | — | — |
|  | Copolymer 2 | — | — | — | — | 1 | 2 |
|  | Phosphorus-based extreme pressure agent | — | — | — | 1.7 | — | — |

TABLE 2-continued

|  | | Example 1 | Example 2 | Comp. Example 1 | Comp. Example 2 | Comp. Example 3 | Comp. Example 4 |
|---|---|---|---|---|---|---|---|
| Kinematic viscosity at 40° C. (mm²/s) | | 3.4 | 3.5 | 3.3 | 3.3 | 3.4 | 3.5 |
| Friction coefficient (μ) | Sliding speed (m/s) | | | | | | |
| | 0.9 | 0.0156 | 0.0157 | 0.0159 | 0.0169 | 0.0161 | 0.0171 |
| | 0.6 | 0.0154 | 0.0156 | 0.0160 | 0.0178 | 0.0166 | 0.0170 |
| | 0.3 | 0.0166 | 0.0168 | 0.0184 | 0.0213 | 0.0203 | 0.0204 |
| | 0.21 | 0.0187 | 0.0188 | 0.0217 | 0.0249 | 0.0249 | 0.0246 |
| | 0.15 | 0.0221 | 0.0221 | 0.0266 | 0.0308 | 0.0311 | 0.0302 |
| | 0.09 | 0.0292 | 0.0304 | 0.0397 | 0.0448 | 0.0460 | 0.0419 |
| | 0.06 | 0.0377 | 0.0407 | 0.0583 | 0.0582 | 0.0569 | 0.0538 |
| | 0.027 | 0.0616 | 0.0662 | 0.0981 | 0.0864 | 0.0846 | 0.0770 |
| | 0.015 | 0.0779 | 0.0792 | 0.1512 | 0.1043 | 0.0973 | 0.0921 |
| | 0.006 | 0.1036 | 0.0967 | 0.2534 | 0.1256 | 0.1207 | 0.1150 |
| | 0.003 | 0.1251 | 0.1158 | 0.2987 | 0.1457 | 0.1330 | 0.1309 |

The invention claimed is:

1. A refrigerating machine oil comprising:
a lubricating base oil; and
a polymer comprising an unsaturated carboxylic acid ester as a monomer unit and having a weight average molecular weight of 50,000 or less,
wherein the unsaturated carboxylic acid ester consists of:
an ester (Eg) of an unsaturated carboxylic acid and an alcohol having a hydrocarbon group represented by the following formula (1):

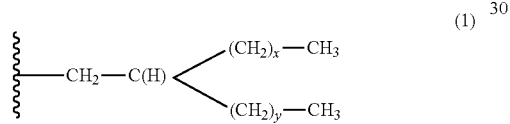

(1)

wherein x represents an integer of 9 to 13, and y represents an integer of 7 to 11, and wherein the alcohol comprises at least one selected from the group consisting of 2-octyldodecanol, 2-decyltetradecanol and 2-dodecylhexadecanol; and
an ester (Es-1) of an unsaturated carboxylic acid and an alcohol having a linear alkyl group having 1 to 4 carbon atoms,
an ester (Es-2) of an unsaturated carboxylic acid and an alcohol having a linear alkyl group having 5 to 19 carbon atoms, and
optionally an ester (Eb) of an unsaturated carboxylic acid and an alcohol having a branched alkyl group having 3 to 18 carbon atoms,
wherein a total proportion of the ester (Eg), the ester (Es-1) and the ester (Es-2) is 90% by mole or more based on the total monomer units constituting the polymer, and
wherein a proportion of the ester (Eg) is 5 to 20% by mole, a proportion of the ester (Es-1) is 60 to 75% by mole, and a proportion of the ester (Es-2) is 10 to 25% by mole, with respect to 100% by mole of the total of the ester (Eg), the ester (Es-1) and the ester (Es-2), and wherein the refrigerating machine oil is used together with a refrigerant.

2. The refrigerating machine oil according to claim 1, wherein the lubricating base oil comprises a first hydrocarbon base oil having a kinematic viscosity at 40° C. of less than 6 mm²/s.

3. The refrigerating machine oil according to claim 2, wherein
the lubricating base oil is a mixed base oil of the first hydrocarbon base oil and a second hydrocarbon base oil having a kinematic viscosity at 40° C. of 6 mm²/s or more, and
a (A)/(B) ratio is more than 1 and 1.5 or less, wherein (A) is a kinematic viscosity at 40° C. of the mixed base oil, and (B) is the kinematic viscosity at 40° C. of the first hydrocarbon base oil.

4. The refrigerating machine oil according to claim 1, wherein a content of the polymer is 5% by mass or less based on a total amount of the refrigerating machine oil.

5. The refrigerating machine oil according to claim 1, having a kinematic viscosity at 40° C. of 6 mm²/s or less.

6. The refrigerating machine oil according to claim 1, wherein the refrigerant is a hydrocarbon refrigerant.

7. A working fluid composition for a refrigerating machine comprising:
the refrigerating machine oil according to claim 1; and
a refrigerant.

8. The working fluid composition for a refrigerating machine according to claim 7, wherein the refrigerant comprises a hydrocarbon refrigerant.

9. The refrigerating machine oil according to claim 1, wherein the unsaturated carboxylic acid of each of the ester (Eg), the ester (Es-1), the ester (Es-2) and the ester (Eb) is a (meth)acrylic acid.

10. The refrigerating machine oil according to claim 1, wherein the polymer consists of the ester (Eg), the ester (Es-1) and the ester (Es-2), as the monomer units.

11. The refrigerating machine oil according to claim 1, wherein the alcohol having the hydrocarbon group represented by the formula (1) comprises the 2-decyltetradecanol.

* * * * *